(12) United States Patent
Chuter (10) Patent No.: US 7,298,376 B2
(45) Date of Patent: Nov. 20, 2007

(54) SYSTEM AND METHOD FOR REAL-TIME CO-RENDERING OF MULTIPLE ATTRIBUTES

(75) Inventor: Christopher John Chuter, Austin, TX (US)

(73) Assignee: Landmark Graphics Corporation, Houston, TX (US)

(*) Notice: Subject to any disclaimer, the term of this patent is extended or adjusted under 35 U.S.C. 154(b) by 370 days.

(21) Appl. No.: 10/628,781

(22) Filed: Jul. 28, 2003

(65) Prior Publication Data

US 2005/0237334 A1    Oct. 27, 2005

(51) Int. Cl.
G09G 5/00      (2006.01)
(52) U.S. Cl. ............. 345/584; 345/424; 345/426; 345/428; 345/440; 345/612; 345/644; 382/108; 382/109; 382/195; 382/206
(58) Field of Classification Search ............. 345/584, 345/612, 644; 382/109
See application file for complete search history.

(56) References Cited

U.S. PATENT DOCUMENTS

| | | | |
|---|---|---|---|
| 4,467,461 A | | 8/1984 | Rice |
| 5,949,424 A | * | 9/1999 | Cabral et al. ............ 345/426 |
| 6,396,495 B1 | | 5/2002 | Parghi et al. |
| 6,690,820 B2 | * | 2/2004 | Lees et al. ............ 382/154 |
| 6,940,507 B2 | * | 9/2005 | Repin et al. ............ 345/424 |
| 7,006,085 B1 | * | 2/2006 | Acosta et al. ............ 345/419 |
| 7,102,647 B2 | * | 9/2006 | Sloan et al. ............ 345/584 |
| 2002/0172401 A1 | | 11/2002 | Lees et al. ............ 382/109 |
| 2004/0081353 A1 | | 4/2004 | Lees et al. ............ 382/154 |

OTHER PUBLICATIONS

Mark J. Kilgard, "A Practical and Robust Bump-mapping Technique for Today's GPUs," Jul. 5, 2000, pp. 1-39, NVIDIA Corporation, Santa Clara, CA.
Jack Lees, "Constructing Faults from Seed Picks by Voxel Tracking," Mar. 1999, pp. 338, 340, *The Leading Edge*.

* cited by examiner

*Primary Examiner*—Kee M. Tung
*Assistant Examiner*—Antonio A Caschera
(74) *Attorney, Agent, or Firm*—Crain Caton & James (57) ABSTRACT

An apparatus and method for enhancing the combined image of multiple attributes without compromising the image of either attribute. The combined image of the multiple attributes is enhanced for analyzing a predetermined property revealed by the attributes. The combined image can be interactively manipulated to display each attribute relative to an imaginary light source or highlighted using a specular component. The method and apparatus are best described as particularly useful for analytical, diagnostic and interpretive purposes.

46 Claims, 5 Drawing Sheets
(3 of 5 Drawing Sheet(s) Filed in Color)

SYSTEM AND METHOD FOR REAL-TIME CO-RENDERING OF MULTIPLE ATTRIBUTES

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention relates to a visualization technique for co-rendering multiple attributes in real time, thus forming a combined image of the attributes. The combined image is visually intuitive in that it distinguishes certain features of an object that are substantially indistinguishable in their natural environment.

2. Related Art

In the applied sciences, various fields of study require the analysis of two-dimensional (2-D) or three-dimensional (3-D) volume data sets wherein each data set may have multiple attributes representing different physical properties. An attribute, sometimes referred to as a data value, represents a particular physical property of an object within a defined 2-D or 3-D space. A data value may, for instance, be an 8-byte data word which includes 256 possible values. The location of an attribute is represented by (x, y, data value) or (x, y, z, data value). If the attribute represents pressure at a particular location, then the attribute location may be expressed as (x, y, z, pressure).

In the medical field, a computerized axial topography (CAT) scanner or magnetic resonance imaging (MRI) device is used to produce a picture or diagnostic image of some specific area of a person's body, typically representing the coordinate and a determined attribute. Normally, each attribute within a predetermined location must be imaged separate and apart from another attribute. For example, one attribute representing temperature at a predetermined location is typically imaged separate from another attribute representing pressure at the same location. Thus, the diagnosis of a particular condition based upon these attributes is limited by the ability to display a single attribute at a predetermined location.

In the field of earth sciences, seismic sounding is used for exploring the subterranean geology of an earth formation. An underground explosion excites seismic waves, similar to low-frequency sound waves that travel below the surface of the earth and are detected by seismographs. The seismographs record the time of arrival of seismic waves, both direct and reflected waves. Knowing the time and place of the explosion the time of travel of the waves through the interior can be calculated and used to measure the velocity of the waves in the interior. A similar technique can be used for offshore oil and gas exploration. In offshore exploration, a ship tows a sound source and underwater hydrophones. Low frequency, (e.g., 50 Hz) sound waves are generated by, for example, a pneumatic device that works like a balloon burst. The sounds bounce off rock layers below the sea floor and are picked up by the hydrophones. In either application, subsurface sedimentary structures that trap oil, such as faults and domes are mapped by the reflective waves.

The data is collected and processed to produce 3-D volume data sets. A 3-D volume data set is made up of "voxels" or volume elements having x, y, z coordinates. Each voxel represents a numeric data value (attribute) associated with some measured or calculated physical property at a particular location. Examples of geological data values include amplitude, phase, frequency, and semblance. Different data values are stored in different 3-D volume data sets, wherein each 3-D volume data set represents a different data value. In order to analyze certain geological structures referred to as "events" information from different 3-D volume data sets must be separately imaged in order to analyze the event.

Certain techniques have been developed in this field for imaging multiple 3-D volume data sets in a single display, however, not without considerable limitations. One example includes the technique published in *The Leading Edge* called "Constructing Faults from Seed Picks by Voxel Tracking" by Jack Lees. This technique combines two 3-D volume data sets in a single display, thereby restricting each original 256-value attribute to 128 values of the full 256-value range. The resolution of the display is, therefore, significantly reduced, thereby limiting the ability to distinguish certain events or features from the rest of the data. Another conventional method combines the display of two 3-D volume data sets, containing two different attributes, by making some data values more transparent than others. This technique becomes untenable when more than two attributes are combined.

Another technique used to combine two different 3-D volume data sets in the same image is illustrated in U.S. patent application Ser. No. 09/936,780, assigned to Magic Earth, Inc. and incorporated herein by reference. This application describes a technique for combining a first 3-D volume data set representing a first attribute and a second 3-D volume data set representing a second attribute in a single enhanced 3-D volume data set by comparing each of the first and second attribute data values with a preselected data value range or criteria. For each data value where the criteria are met, a first selected data value is inserted at a position corresponding with the respective data value in the enhanced 3-D volume data set. For each data value where the criteria are not met, a second selected data value is inserted at a position corresponding with the respective data value in the enhanced 3-D volume data set. The first selected data value may be related to the first attribute and the second selected data value may be related to the second attribute. The resulting image is an enhanced 3-D volume data set comprising a combination or hybrid of the original first 3-D volume data set and the second 3-D volume data set. As a result, the extra processing step needed to generate the enhanced 3-D volume data set causes interpretation delays and performance slow downs. Furthermore, this pre-processing technique is compromised by a "lossy" effect which compromises data from one seismic attribute in order to image another seismic attribute. Consequently, there is a significant loss of data visualization.

In non-scientific applications, techniques have been developed to define surface details (texture) on inanimate objects through lighting and/or shading techniques. For example, in the video or computer graphics field, one technique commonly used is texture mapping. Texture typically refers to bumps, wrinkles, grooves or other irregularities on surfaces. Textured surfaces are recognized by the way light interacts with the surface irregularities. In effect, these irregularities are part of the complete geometric form of the object although they are relatively small compared to the size and form of the object. Conventional texture mapping techniques have been known to lack the necessary surface detail to accomplish what is conventionally meant by texture. In other words, conventional texture mapping techniques provide objects with a colorful yet flat appearance. To this end, texture mapping was expanded to overcome this problem with what is now commonly referred to as bump mapping.

Bump mapping is explained in an article written by Mark Kilgard called "A Practical and Robust Bump Mapping Technique for Today's GPU's" (hereinafter Kilgard) which is incorporated herein by reference. In this article, bump mapping is described as "a texture-based rendering approach for simulating lighting effects caused by pattern irregularities on otherwise smooth surfaces." Kilgard, p. 1. According to Kilgard, "bump mapping simulates a surface's irregular lighting appearance without the complexity and expense of modeling the patterns as true geometric perturbations to the surface." Kilgard, p. 1. Nevertheless, the computations required for original bump mapping techniques proposed by James Blinn in 1978 are considerably more expensive than those required for conventional hardware texture mapping. Kilgard at p. 2.

In view of the many attempts that have been made over the last two decades to reformulate bump mapping into a form suitable for hardware implementation, Kilgard proposes a new bump mapping technique. In short, Kilgard divides bump mapping into two steps. First, a perturbed surface normal is computed. Then, a lighting computation is performed using the perturbed surface normal. These two steps must be performed at each and every visible fragment of a bump-mapped surface. Kilgard.

Although Kilgard's new technique may be suitable for simulating surface irregularities (texture) representative of true geometric perturbations, it does not address the use of similar lighting effects to distinguish certain features of an object that are substantially indistinguishable in their natural environment.

SUMMARY OF THE INVENTION

The present invention therefore, provides system and method for enhancing the combined image of multiple attributes representing 2-D or 3-D objects. In one embodiment, a first attribute is selected from a source of available attributes and represents one property of the object. A second attribute is selected from the same source of attributes and represents another property of the object. Additional attributes may be selected, depending on the available source of attributes.

A normal map is created using voxels from either the first attribute or the second attribute. The normal map is derived from the data values representing the first or second attribute, hereinafter the underlying attribute, and is used to construct lighting effects that provide an illusion of height, depth and geometry on a planar surface.

In order to obtain a more accurate lighting effect, a vertex program is applied to the vertices that constrain the planar surface of the underlying attribute and the vertices that constrain the corresponding planar surface of the normal map. As a result, a new coordinate space is created thus, forming a matrix that is commonly referred to as tangent space that is later used by the register combiners The register combiners, or texture shaders, are used to calculate ambient and diffuse lighting effects (illumination) for the normal map, after the vertex program is applied, and the other first or second attribute which are combined to form an enhanced image representing the first and second attributes. In this manner, the combined image of the co-rendered attributes is displayed thus, revealing certain features of the object represented by the attributes that are substantially indistinguishable in their natural environment.

In another embodiment, select features of the object are interactively highlighted by altering lighting coefficients representing the specular and/or diffuse component of an imaginary light source. In this manner, the register combiners are reapplied to alter the ambient and diffuse lighting effects and highlight certain features of the object as the combined image is displayed.

In another embodiment, the light source is interactively repositioned or the combined image is interactively rotated to reveal select features of the object represented by the attributes. As the image is rotated, or the light source repositioned, certain voxels representing the first attribute become darkly shaded or shadowed, while others representing the second attribute become visible and vice versa. This embodiment is therefore, useful for enhancing images of select features of an object which, in their natural environment, are indistinguishable from the rest of the object. In this manner, the vertex program and register combiners are reapplied and the image is displayed.

In another embodiment, the per-pixel lighting height is interactively controlled. The per-pixel lighting height is often referred to as the height of the bumps or depth of the indentions defined by the lighting effect produced on a per pixel basis. As the per-pixel lighting height is altered, the normal map is recalculated, the vertex program and register combiners are reapplied, and the image is displayed.

In yet another embodiment, one or more different attributes are selected to image other select features of the object in the manner thus described. Thus, in this embodiment, the foregoing steps and techniques are reapplied as a new combined image is displayed.

In yet another embodiment, the combined image is interactively controlled (moved/resized) to display select features of the object at different locations. In this manner, the attributes are resampled, the normal map is recalculated, the vertex program and register combiners are reapplied, and the combined image is displayed at its new location.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention will be described with reference to the accompanying drawings, in which like elements are referenced with like reference numerals, and in which.

While the present invention will be described in connection with presently preferred embodiments, it will be understood that it is not intended to limit the invention to those embodiments. On the contrary, it is intended to cover all alternatives, modifications, and equivalents included within the spirit of the invention.

DETAILED DESCRIPTION OF THE PREFERRED EMBODIMENTS

The present invention may not be implemented using hardware, software or a combination thereof, and may be implemented in a computer system or other processing system. The following description applies the present invention to various seismic data attributes which are contained within a specified space or volume referred to as a probe. Each probe comprises voxel data represented by x, y, z, data value. Each data value is associated with a particular seismic data attribute at a specified location (x, y, z). The present invention, therefore, may employ one or more of the hardware and software system components required to display and manipulate the probe as described in U.S. Pat. No. 6,765,570("'570 Patent") assigned to Landmark Graphics Corporation and incorporated herein by reference. For a more complete description of the probe requirements, reference is made to the '570 Patent.

In addition to the probe requirements, the present invention may be implemented using current high performance graphics and personal computer commodity hardware in order to insure real time performance. Examples of available hardware for the personal computer include graphics cards like GeForce® marketed by NVIDIA® and 2.4 Ghz×86 instruction set computer processors manufactured by Intel® or AMD®.

Figure 1:
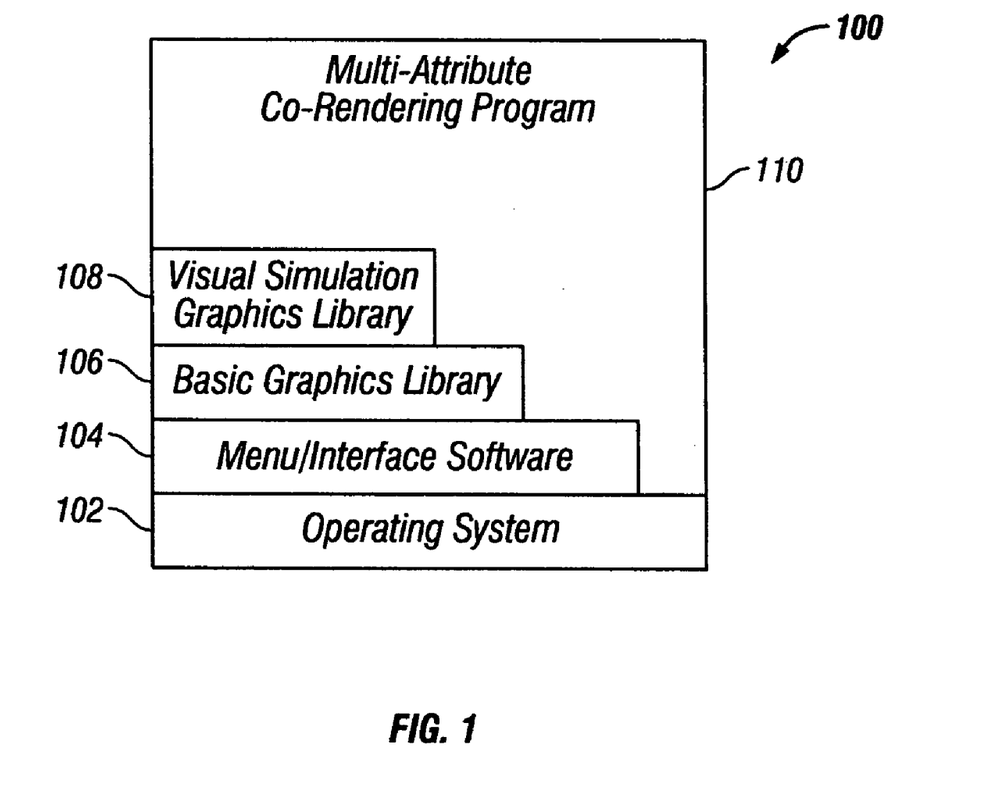
FIG. 1 is a block diagram illustrating one embodiment of a software program for implementing the present invention.

One embodiment of a software or program structure for implementing the present invention is shown in FIG. 1. At the base of program structure 100 is an operating system 102. Suitable operating systems may include, for example, UNIX® or LINUX® operating systems, Windows NT®, and other operating systems generally known in the art.

Menu and interface software 104 overlays operating system 102. Menu and interface software 104 are used to provide various menus and windows to facilitate interaction with the user, and to obtain user input and instructions. Menu and interface software 104 may include, for example, Microsoft Windows®, X Free 86®, MOTIF®, and other menu and interface software generally known in the art.

A basic graphics library 106 overlays menu and interface software 104. Basic graphics library 106 is an application programming interface (API) for 3-D computer graphics. The functions performed by basic graphics library 106 include, for example, geometric and raster primitives, RGBA or color index mode, display list or immediate mode, viewing and modeling transformations, lighting and shading, hidden surface removal, alpha blending (translucency), anti-aliasing, texture mapping, atmospheric effects (fog, smoke, haze), feedback and selection, stencil planes, and accumulation buffer.

A particularly useful basic graphics library 106 is OpenGL®, marketed by Silicon Graphics, Inc. ("SGI®"). The OpenGL® API is a multi-platform industry standard that is hardware, window, and operating system independent. OpenGL® is designed to be callable from C, C++, FORTRAN, Ada and Java programming languages. OpenGL® performs each of the functions listed above for basic graphics library 106. Some commands in OpenGL® specify geometric objects to be drawn, and others control how the objects are handled. All elements of the OpenGL® state, even the contents of the texture memory and the frame buffer, can be obtained by a client application using OpenGL®. OpenGL® and the client application may operate on the same or different machines because OpenGL® is network transparent. OpenGL® is described in more detail in the OpenGL® Programming Guide (ISBN: 0-201-63274-8) and the OpenGL® Reference Manual (ISBN: 0-201-63276-4), both of which are incorporated herein by reference.

Visual simulation graphics library 108 overlays the basic graphics library 106. Visual simulation graphics library 108 is an API for creating real-time, multi-processed 3-D visual simulation graphics applications. Visual simulation graphics library 108 provides functions that bundle together graphics library state control functions such as lighting, materials, texture, and transparency. These functions track state and the creation of display lists that can be rendered later.

A particularly useful visual simulation graphics library 108 is OpenGL Performer®, which is available from SGI®. OpenGL Performer® supports the OpenGL® graphics library discussed above. OpenGL Performer® includes two main libraries (libpf and libpr) and four associated libraries (libpfdu, libpfdb, libpfui, and libpfutil).

The basis of OpenGL Performer® is the performance rendering library libpr, a low-level library providing high speed rendering functions based on GeoSets and graphics state control using GeoStates. GeoSets are collections of drawable geometry that group same-type graphics primitives (e.g., triangles or quads) into one data object. The GeoSet contains no geometry itself, only pointers to data arrays and index arrays. Because all the primitives in a GeoSet are of the same type and have the same attributes, rendering of most databases is performed at maximum hardware speed. GeoStates provide graphics state definitions (e.g., texture or material) for GeoSets.

Layered above libpr is libpf, a real-time visual simulation environment providing a high-performance multi-process database rendering system that optimizes use of multiprocessing hardware. The database utility library, libpfdu, provides functions for defining both geometric and appearance attributes of 3-D objects, shares state and materials, and generates triangle strips from independent polygonal input. The database library libpfdb uses the facilities of libpfdu, libpf and libpr to import database files in a number of industry standard database formats. The libpfui is a user interface library that provides building blocks for writing manipulation components for user interfaces (C and C++ programming languages). Finally, the libpfutil is the utility library that provides routines for implementing tasks and graphical user interface (GUI) tools.

An application program which uses OpenGL Performer® and OpenGL® API typically performs the following steps in preparing for real-time 3-D visual simulation:

1. Initialize OpenGL Performer®;
2. Specify number of graphics pipelines, choose the multiprocessing configuration, and specify hardware mode as needed;
3. Initialize chosen multiprocessing mode;
4. Initialize frame rate and set frame-extend policy;

5. Create, configure, and open windows as required; and
6. Create and configure display channels as required.

Once the application program has created a graphical rendering environment by carrying out steps 1 through 6 above, then the application program typically iterates through the following main simulation loop once per frame:

1. Compute dynamics, update model matrices, etc.;
2. Delay until the next frame time;
3. Perform latency critical viewpoint updates; and
4. Draw a frame.

Alternatively, Open Scene Graph® can be used as the visual simulation graphics library 108. Open Scene Graph® operates in the same manner as OpenGL Performer®, providing programming tools written in C/C++ for a large variety of computer platforms. Open Scene Graph® is based on OpenGL® and is publicly available.

A multi-attribute co-rendering program 110 of the present invention overlays visual simulation graphics library 108. In a manner generally well known in the art, program 110 interfaces with, and utilizes the functions carried out by, the visual simulation graphics library 108, basic graphics library 106, menu and interface software 104, operating system 102 and the probe described in the '634 application. Program 110 is preferably written in an object oriented programming language to allow the creation and use of objects and object functionality. One preferred object oriented programming language is C++.

In this particular embodiment, program 110 stores the 3-D volume data set in a manner generally well known in the art. For example, the format for a particular data volume may include two parts: a volume header followed by the body of data that is as long as the size of the data set. The volume header typically includes information in a prescribed sequence, such as the file path (location) of the data set, size, dimensions in the x, y, and z directions, annotations for the x, y, and z axes, annotations for the data value, etc. The body of data is a binary sequence of bytes and may include one or more bytes per data value. For example, the first byte is the data value at volume location (0,0,0); the second byte is the data value at volume location (1,0,0); and the third byte is the data value at volume location (2,0,0). When the x dimension is exhausted, then the y dimension and the z dimension are incremented, respectively. This embodiment is not limited in any way to a particular data format.

The program 110 facilitates input from a user to identify one or more 3-D volume data sets to use for imaging and analysis. When a plurality of data volumes is used, the data value for each of the plurality of data volumes represents a different physical parameter or attribute for the same geographic space. By way of example, a plurality of data volumes could include a geology volume, a temperature volume, and a water-saturation volume. The voxels in the geology volume can be expressed in the form (x, y, z, seismic amplitude). The voxels in the temperature volume can be expressed in the form (x, y, z, ° C.). The voxels in the water-saturation volume can be expressed in the form (x, y, z, % saturation). The physical or geographic space defined by the voxels in each of these volumes is the same. However, for any specific spatial location ($x_0$, $y_0$, $z_0$), the seismic amplitude would be contained in the geology volume, the temperature in the temperature volume, and the water-saturation in the water-saturation volume. The operation of program 110 is described in reference to FIGS. 2 through 8.

Figure 2:
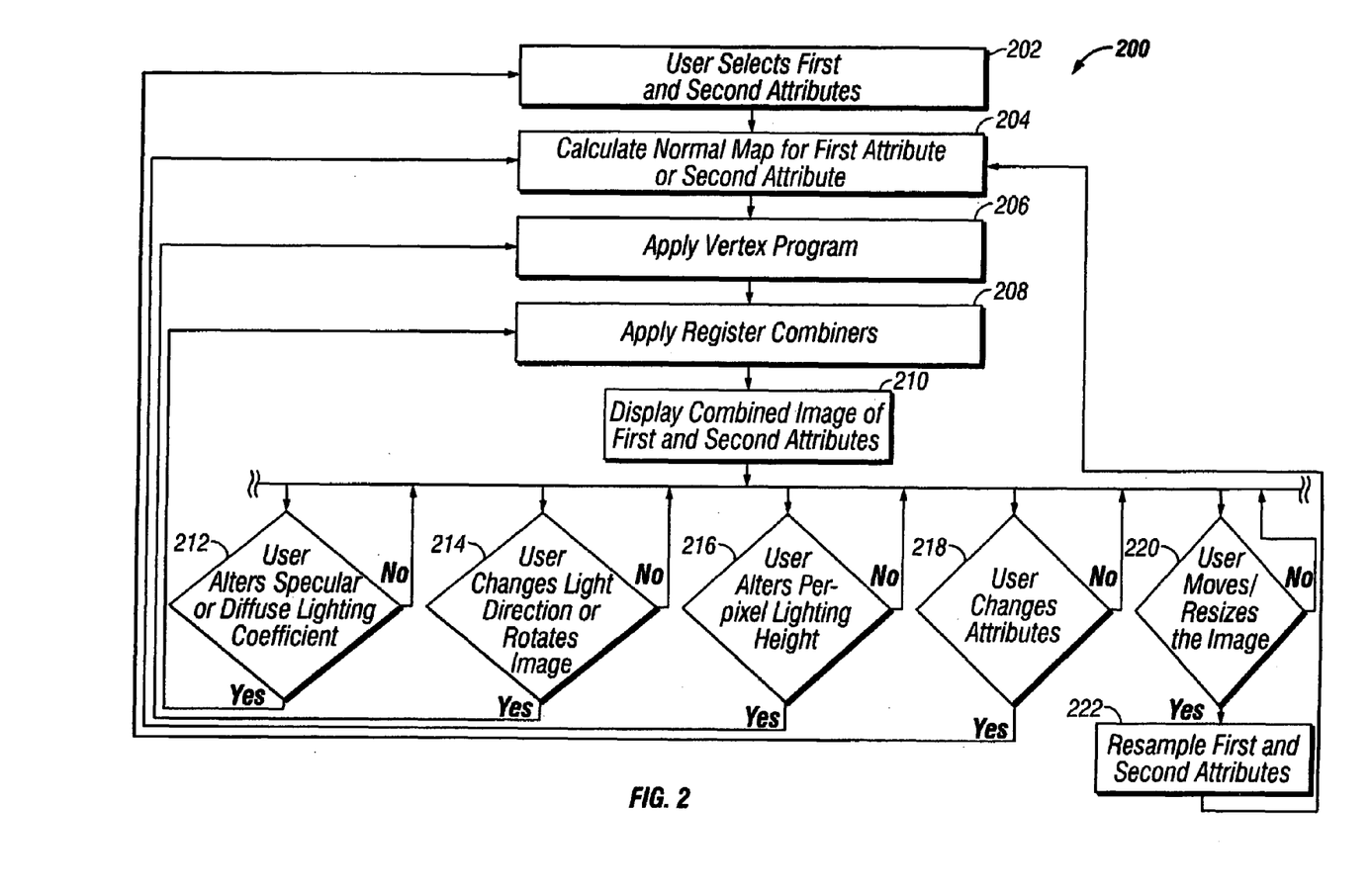
FIG. 2 is a flow diagram illustrating one embodiment of a method for implementing the present invention.

Referring now to FIG. 2, a method 200 is illustrated for co-rendering multiple attributes in a combined image. The following description refers to certain bump mapping algorithms and techniques discussed in Kilgard.

In Step 202, a first attribute and a second attribute are selected from the available attributes using the GUI tools (menu/interface software 104) described in reference to FIG. 1. Although other available stored attributes may be used, such as frequency and phase, semblance is used as the first attribute illustrated in the probe 300 of FIG. 3, and amplitude is used as the second attribute illustrated in the probe 400 of FIG. 4. The seismic data is displayed on the visible planar surfaces of the probe using conventional shading/opacity (texture mapping) techniques, however, may be displayed within the planar surfaces defining the probe using volume rendering techniques generally well known in the art. In order to display seismic data in the manner thus described, voxel data is read from memory and converted into a specified color representing a specific texture. Textures are tiled into 256 pixel by 256 pixel images. For large volumes, many tiles exist on a single planar surface of the probe. This process is commnonly referred to by those skilled in the art as sampling, and is coordinated among multiple CPU's on a per-tile basis. These techniques, and others employed herein, are further described and illustrated in the '570 Patent.

In Step 204, a normal map is calculated in order to convert the texture based semblance attribute illustrated in FIG. 3, sometimes referred to as a height field, into a normal map that encodes lighting information that will be used later by the register combiners. This technique enables the application of per-pixel lighting to volumetric data in the same way the probe displays volumetric data. In other words, it is a 2-D object which is actually displayed, however, because it is comprised of voxel data and the speed at which it is displayed, appears as a 3-D object. In short, this step converts the data values representing the semblance attribute into perturbed normalized vectors that are used by the graphics card to calculate lighting effects which give the illusion of depth and geometry when, in fact, a planar surface is displayed.

The normal map comprises multiple perturbed normal vectors which, collectively, are used to construct an illusion of height, depth and geometry on a planar surface. Each perturbed normal vector is derived from the cross product of the vertical and horizontal components for each data value on a given surface (e.g., 310) in FIG. 3. Each perturbed normal vector is stored in the hardware as a texture unit (normal map) wherein each spatial coordinate (x, y, z) for each perturbed normal vector is assigned a specified color red, green or blue (RGB) value. The coordinate space in which these coordinates are assigned RGB values is generally known as texture coordinate space. Thus, the blue component of the perturbed normal vector represents the spatial coordinate (z). A pixel in the texture that is all blue would therefore, represent a typical tangent vector in planar objects such as the surface 310 in FIG. 3. As the data values vary, the normal map appearance becomes less blue and appears almost chalky. The techniques necessary to derive a normal map from a height field are generally described in Section 5.3 of Kilgard. By applying the equations referred to in Section 2.6 of Kilgard to the data values shown in the probe 300 of FIG. 3, a normal map may be constructed. One set of instructions to perform this method and technique is illustrated in Appendix E of Kilgard.

Figure 3:
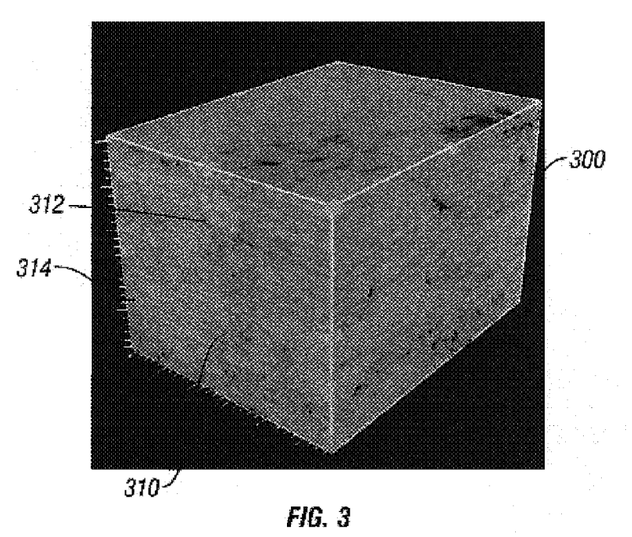
FIG. 3 is a color drawing illustrating semblance as a seismic data attribute.

In order to obtain a more accurate lighting effect, a vertex program is applied in Step 206 to the vertices that constrain the planar surface 310 of the underlying attribute illustrated in FIG. 3 and the vertices that constrain the corresponding planar surface of the normal map (not shown). A new coordinate space, tangent space, is contained in a transformation matrix used by the vertex program. The programmable hardware on the graphics card is used for rendering coordinate space transforms that drive the vertex program. The tangent space is constructed on a per-vertex basis, and typically requires the CPU to supply per-vertex light-angle vectors and half-angle vectors as 3-D texture coordinates. The light angle vectors and half angle vectors are likewise converted to tangent space when multiplied by the tangent space matrix. This step employs the techniques generally described in Section 5.1 of Kilgard.

For example, normal and tangent vectors are calculated on a per-vertex basis for a given geometric model—like the probe 300 in FIG. 3. A bi-normal vector is calculated by taking the cross product of the tangent and normal vector components for each vertex. The tangent, normal and bi-normal vectors thus, form an ortho-normal basis at each vertex. The ortho-normal basis represents a matrix used to transform objects, space, light and eye position into tangent space. One set of instructions for performing this technique is illustrated in Appendix C of Kilgard.

Figure 4:
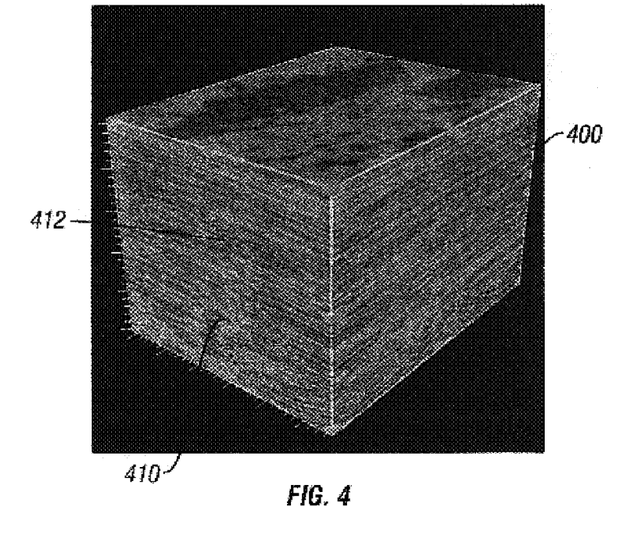
FIG. 4 is a color drawing illustrating amplitude as a seismic data attribute.

Register combiners or texture shaders (not shown) are applied by the graphics card in Step 208 to calculate the lighting equations described in Sections 2.5 through 2.5.1 of Kilgard. The GeForce® and Quadro® register combiners, available through NVIDIA,® provide a configurable, but not programmable, means to determine per-pixel fragment coloring/shading, and replace the standard OpenGL® fixed function texture environment, color sum, and fog operations with an enhanced mechanism for coloring/shading fragments. With multi-textured OpenGL®, filtered texels from each texture unit representing the normal map and the second attribute (amplitude) illustrated in the probe 400 of FIG. 4 are combined with the fragments' current color in sequential order. The register combiners are generally described in Section 4.2 of Kilgard as a sequential application of general combiner stages that culminate in a final combiner stage that outputs an RGBA color for the fragment. One set of instructions for programming OpenGL® register combiners is illustrated in Appendix B of Kilgard.

As further explained in Section 5.4 of Kilgard, the register combiners are configured to compute the ambient and diffuse illumination for the co-rendered image that is displayed in Step 210 by means generally well-known in the art. In short, the register combiners are used to calculate ambient and diffuse lighting effects (illumination) for the normal map, after the vertex program is applied, and the second attribute which are combined to form an enhanced image representing the first and second attributes. The resulting data values for the combined image represent a blended texture or combined texture of both the first and second attributes One set of instructions for programming the register combiners to compute the ambient and diffuse illumination is illustrated in Appendix G of Kilgard.

Alternatively, fragment routines, generally well known in the art, may be used with the register combiners to provide a more refined per-pixel lighting effect for the normal map.

As illustrated in FIG. 3, certain geological features, such as faults represented by the black color values 312, are distinguished from the blue color values 314 due to discontinuity between the adjacent data values measured along the z-axis. In FIG. 4, the same geological features 412 are barely distinguishable because they are illustrated by a different attribute (amplitude) that is assigned multiple color values and contains more consistent adjacent data values along the z-axis. The same geological features 512 are even more readily distinguished in FIG. 5 due to the enhanced surface texture which appears to give the planar surface 510 on the probe 500 depth and height.

Figure 5:
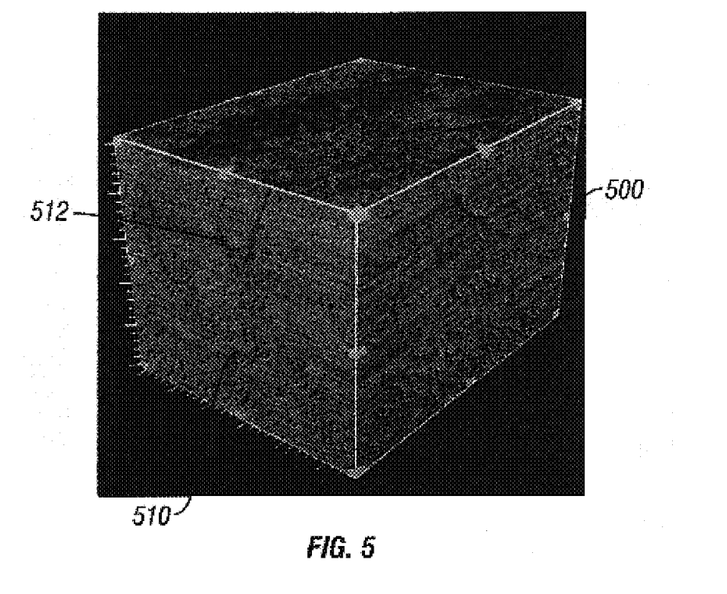
FIG. 5 is a color drawing illustrating the combined image of both attributes illustrated in FIGS. 3 and 4.

In FIG. 5, the first attribute (semblance) is distinguished by shading from the second attribute (amplitude) which is shown by various color values. This illusion is uncharacteristic of the actual geological feature which is substantially indistinguishable in its natural environment. Although both attributes are not visible at the same time over the planar surface 510 of the probe 500, they are imaged in the same space and capable of being simultaneously viewed depending on the angle of the probe 500 relative to the light source. Thus, as the probe 500 is rotated, certain voxels representing the first attribute become masked while others representing the second attribute become visible, and vice-versa. This technique is useful for enhancing images of certain features of an object which are substantially indistinguishable in their natural environment. The present invention may also be applied, using the same techniques, to image volume-rendered seismic-data attributes.

As the image is displayed in Step 210, several options described in reference to Steps 212 through 220 may be interactively controlled through the menu/interface software 104 to compare and analyze any differences between the various images.

In Step 212, the specular or diffuse lighting coefficients may be interactively controlled to alter the shading/lighting effects applied to the combined image. Accordingly, the register combiners are reapplied in Step 208 to enhance the image displayed in Step 210.

Figure 6:
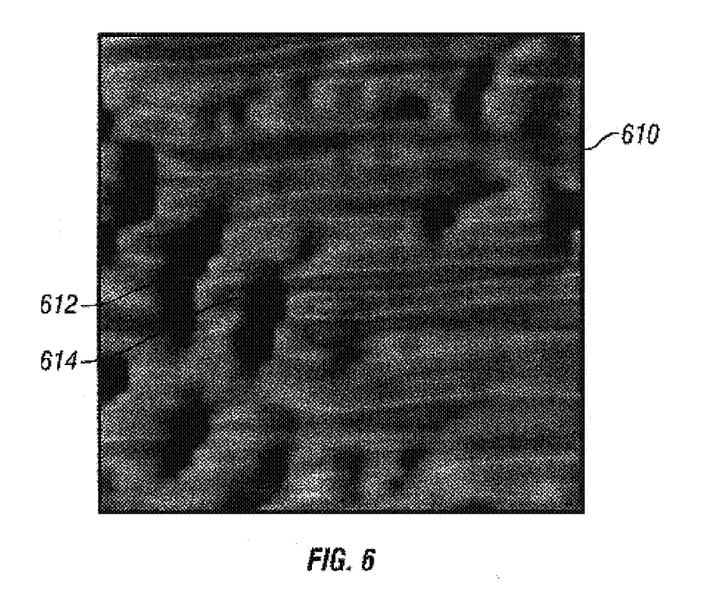
FIG. 6 is a color drawing illustrating the combined image of FIG. 5 with the light source positioned to the left of the image.
Figure 7:
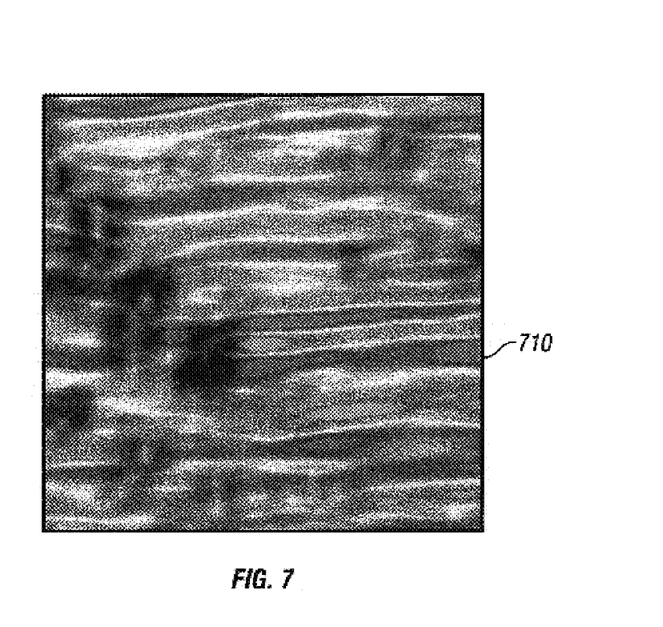
FIG. 7 is a color drawing illustrating the combined image of FIG. 5 with the light source positioned perpendicular to the image.
Figure 8:
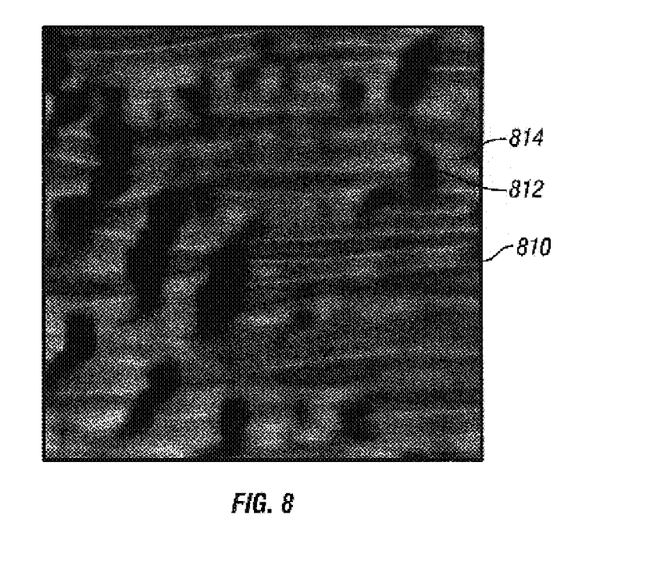
FIG. 8 is a color drawing illustrating the combined image of FIG. 5 with the light source positioned to the right of the image.

In Step 214, the imaginary light source may be interactively repositioned or the probe may be interactively rotated to image other geological features revealed by the attributes. The movement of the probe is accomplished by means generally described in the '634 application. In FIGS. 6-8, the planar surface 510 of the probe 500 illustrated in FIG. 5 is fixed at a position perpendicular to the line of sight as the light source is interactively repositioned. As the light source moves, different voxels become illuminated according to the position of the light source. The effect is similar to that achieved when the probe is rotated. Accordingly, Steps 206 and 208 are reapplied to provide different perspectives of the image displayed in Step 210.

In FIG. 6, for example, the light source is positioned to the left of the probe face 610 so that voxels 612, which are perceived as indentions, appear darker while voxels 614, which are perceived as bumps, appear lighter or more illuminated. When the light source is repositioned to the right of the probe face 810, as in FIG. 8, different voxels 812, 814 appear darker and lighter than those illustrated in FIG. 6. As illustrated in FIG. 7, the light source is positioned perpendicular to the probe face 710 and the entire image appears brighter. This effect is attributed to the specular component of the lighting equation, and enhances the illusion of depth and height in the image as the light source is repositioned or the probe is rotated. One set of instructions explaining how to configure the register combiners to compute the specular component is illustrated in Appendix H of Kilgard. In this manner, the combined image can be interactively manipulated to simultaneously reveal multiple attributes with nominal loss in the clarity of each attribute.

In Step 216, the per-pixel lighting height is interactively controlled to alter the normal depth of the indentions and/or height of the bumps which are shaded and illuminated as described in reference to Step 208. The per-pixel lighting height is interactively controlled by scaling each perturbed normal vector from zero which cancels any indentations or bumps. If the per-pixel lighting is scaled in positive increments, then each perturbed normal vector height (bump) or depth (indentation) is increased. Conversely, if the per-pixel lighting is scaled in negative increments, then each perturbed normal vector height or depth is decreased. The net effect produces an image that appears to alter the position of the light source so that different features of the object are enhanced. Accordingly, Steps 204, 206, and 208 are reapplied to provide different perspectives of the image displayed in Step 210.

In Step 218, different attributes are interactively selected in the manner described in reference to Step 202. Accordingly, Steps 204, 206, and 208 are reapplied to provide an entirely new image, illustrating different data values in Step 210. Furthermore, the image displayed in Step 210 may illustrate more than two attributes which are selected in Step 218. For example, if the available attributes include amplitude, phase and semblance, then a normal map is created for any two of these attributes in the manner described in reference to Step 204. In other words, a normal map is calculated or each of the two selected attributes and the resulting value for each perturbed normal vector in one normal map is then added to the value of each perturbed normal vector in the other normal map, at the same location, to create a single normal map that is used in the manner described in reference to Steps 206 and 208. Alternatively, the voxels for one of the selected attributes can be added to the voxels of the other selected attribute at the same location and a normal map is calculated for the combined voxel values in the manner described in reference to Step 204. The normal map is then used in the manner described in reference to Steps 206 and 208. In either application where there are more than two attributes, one attribute will serve as the static attribute until Step 208, while the others will be used in the manner thus described.

In Step 220, the probe is interactively controlled so that it can be resized or moved in a manner more particularly described in the '570 Patent. This step necessarily alters the voxels displayed on the planar surfaces of the probe for the combined image displayed in Step 210. As a result, the first and second attributes must be re-sampled in Step 222 and Steps 204, 206, and 208 must be reapplied to display a new image in Step 210 illustrating the same attributes at a different location.

The techniques described by the foregoing invention remove the extra processing step normally encountered in conventional bump mapping techniques by interactively processing the attributes using hardware graphics routines provided by commodity PC graphics cards. These techniques are therefore, particularly useful to the discovery and development of energy resources.

The foregoing disclosure and description of the invention is illustrative and explanatory thereof, and it will be appreciated by those skilled in the art, that various changes in the size, shape and materials, the use of mechanical equivalents, as well as in the details of the illustrated construction or combinations of features of the various elements may be made without departing from the spirit of the invention.

The invention claimed is:

1. A method for enhancing an image of one or more attributes representing a property of an object, which comprises the steps of:
   selecting a first attribute and a second attribute from multiple attributes, the first attribute and the second attribute each having its own vertices;
   creating a normal map using at least one of the first and second attributes, the normal map having its own vertices;
   converting the normal map vertices and the vertices of the at least one of the first and second attributes used to create the normal map into a matrix representing a tangent space normal map;
   calculating a diffuse lighting component from the tangent space normal map and the at least one of the first and second attributes used to create the normal map; and
   combining an ambient lighting component with the diffuse lighting component and at least one of the first and second attributes to form an enhanced image representing at least one property of the object.

2. The method of claim 1, wherein at least one of the first attribute and the second attribute comprise a combination of two or more attributes.

3. The method of claim 2, wherein the combination of two or more attributes form a hybrid attribute.

4. The method of claim 2, wherein the first attribute comprises any combination of two or more attributes comprising amplitude, frequency, phase, power, semblance, coherency, dip, azimuth, gradient, fluid factor, acoustic impedance, velocity, pressure, porosity, permeability, stratigraphy and lithology and the second attribute comprises at least one attribute from amplitude, frequency, phase, power, semblance, coherency, dip, azimuth, gradient, fluid factor, acoustic impedance, velocity, pressure, porosity, permeability, stratigraphy and lithology.

5. The method of claim 1, wherein the ambient lighting component and diffuse lighting component are combined with the first attribute and the second attribute is used to create the normal map.

6. The method of claim 1, wherein the ambient lighting component and the diffuse lighting component are combined with the first attribute and the first attribute is used to create the normal map.

7. The method of claim 1, further comprising the steps of:
   selecting a third attribute, the third attribute having its own vertices;
   creating another normal map using at least one of the first, second and third attributes, the another normal map having its own vertices;
   converting the another normal map vertices and the vertices of the at least one of the first, second and third attributes used to create the another normal map into another matrix representing another tangent space normal map;
   calculating another diffuse lighting component from the another tangent space normal map and the at least one of the first, second and third attributes used to create the another normal map; and
   combining the ambient lighting component with the another diffuse lighting component and at least one of the first, second and third attributes to form another enhanced image representing another property of the object.

8. The method of claim 7, wherein the third attribute comprises the combination of the ambient lighting component, the diffuse lighting component and the at least one of the first and second attributes.

9. The method of claim 8, wherein the another normal map is created using at least one of the first and second attributes and the third attribute is combined with the ambient lighting component and the another diffuse lighting component to form the another enhanced image.

10. The method of claim 8, wherein the another normal map is created using the third attribute and the third attribute is combined with the ambient lighting component and the another diffuse lighting component to form the another enhanced image.

11. The method of claim 1, further comprising the step of displaying at least a portion of the enhanced image to a user.

12. The method of claim 11, wherein the enhanced image displayed is displayed on at least a portion of one of a plurality of planar surfaces defining a probe.

13. The method of claim 11, wherein the enhanced image displayed is displayed at least partially within a plurality of planar surfaces defining a probe.

14. The method of claim 1, wherein the first attribute and the second attribute each comprise multiple data values and associated spatial coordinates, each data value having a three-dimensional spatial coordinate.

15. The method of claim 14, wherein the normal map comprises multiple perturbed normal vectors that are derived from the cross product of a vertical component and a horizontal component for each data value.

16. The method of claim 1, wherein a vertex program is used to convert the normal map vertices and the vertices of the at least one of the first and second attributes used to create the normal map into the matrix representing the tangent space normal map.

17. The method of claim 1, wherein the diffuse lighting component and the ambient lighting component are each calculated using a register combiner.

18. The method of claim 17, wherein the ambient lighting component, the diffuse lighting component and the at least one of the first and second attributes are combined using the register combiners to form the enhanced image.

19. The method of claim 1, wherein the first attribute and the second attribute comprise medical data.

20. The method of claim 1, wherein the first attribute and the second attribute comprise seismic data.

21. The method of claim 1, wherein the ambient lighting component is a predetermined constant.

22. The method of claim 1, further comprising the steps of:
calculating a specular lighting component from the tangent space normal map and the at least one of the first and second attributes used to create the normal map; and
combining the specular lighting component, the ambient lighting component, the diffuse lighting component and the at least one of the first and second attributes to form the enhanced image.

23. The method of claim 1, further comprising the steps of:
applying an imaginary light source to the enhanced image;
displaying a portion of the enhanced image to a user;
interactively repositioning at least one of the imaginary light source and the displayed enhanced image relative to a line of sight of the displayed enhanced image to the user;
and
repeating the converting, calculating and combining steps in claim 1.

24. A method for enhancing an image of one or more attributes representing a property of an object which comprises the steps of:
selecting an attribute from multiple attributes, the attribute having its own vertices;
creating a normal map using the attribute, the normal map having its own vertices;
converting the normal map vertices and the vertices of the attribute into a matrix representing a tangent space normal map;
calculating a diffuse lighting component from the tangent space normal map and the attribute; and
combining an ambient lighting component with the diffuse lighting component and the attribute to form an enhanced image representing at least one property of the object.

25. A method for enhancing an image of multiple attributes representing a property of an object, which comprises the steps of:
selecting a first attribute and a second attribute from the multiple attributes, the first attribute and the second attribute each having its own vertices;
creating a normal map using at least one of the first and second attributes, the normal map having its own vertices;
converting the normal map vertices and the vertices of the at least one of the first and second attributes used to create the normal map into a matrix representing a tangent space normal map;
calculating a diffuse lighting component from the tangent space normal map and the at least one of the first and second attributes used to create the normal map;
combining an ambient lighting component with the diffuse lighting component and the first and second attributes to form an enhanced image of the first and second attributes; and
displaying at least a portion of the enhanced image to a user, the portion of the displayed enhanced image comprising at least part of the first attribute and part of the second attribute.

26. The method of claim 25, wherein the first and second attributes represent a geophysical property of the object.

27. A system comprising a program storage device readable by a machine, the storage device embodying a program of instructions executable by the machine for enhancing an image of one or more attributes representing a property of an object, the instructions comprising the steps of:
selecting a first attribute and a second attribute from multiple attributes, the first attribute and the second attribute each having its own vertices;
creating a normal map derived from at least one of the first and second attributes, the normal map having its own vertices;
converting the normal map vertices and the vertices of the at least one of the first and second attributes used to create the normal map into a matrix representing a tangent space normal map;
calculating a diffuse lighting component from the tangent space normal map and the at least one of the first and second attributes used to create the normal map;
and
combining an ambient lighting component with the diffuse lighting component and at least one of the first and second attributes to form an enhanced image representing at least one property of the object.

28. The system of claim 27, wherein at least one of the first attribute and the second attribute comprise a combination of two or more attributes.

29. The system of claim 28, wherein the combination of two or more attributes form a hybrid attribute.

30. The system of claim 28, wherein the first attribute comprises any combination of two or more attributes comprising amplitude, frequency, phase, power, semblance, coherency, dip, azimuth, gradient, fluid factor, acoustic impedance, velocity, pressure, porosity, permeability, stratigraphy and lithology and the second attribute comprises at least one attribute from amplitude, frequency, phase, power, semblance, coherency, dip, azimuth, gradient, fluid factor, acoustic impedance, velocity, pressure, porosity, permeability, stratigraphy and lithology.

31. The system of claim 27, wherein the ambient lighting component and the diffuse lighting component are combined with the first attribute and the second attribute is used to create the normal map.

32. The system of claim 27, wherein the ambient lighting component and the diffuse lighting component are combined with the first attribute and the first attribute is used to create the normal map.

33. The system of claim 27, further comprising the steps of:
  selecting a third attribute, the third attribute having its own vertices;
  creating another normal map derived from at least one of the first, second and third attributes, the another normal map having its own vertices;
  converting the another normal map vertices and the vertices of the at least one of the first, second and third attributes used to create the another normal map into another matrix representing another tangent space normal map;
  calculating a diffuse lighting component from the another tangent space normal map and the at least one of the first, second and third attributes used to create the another normal map; and
  combining the ambient lighting component with the another diffuse lighting component and at least one of the first, second and third attributes to form another enhanced image representing another property of the object.

34. The system of claim 33, wherein the third attribute comprises the combination of the ambient lighting component, the diffuse lighting component and the at least one of the first and second attributes.

35. The system of claim 34, wherein the another normal map is created using at least one of the first and second attributes and the third attribute is combined with the ambient lighting component and the another diffuse lighting component to form the another enhanced image.

36. The system of claim 34, wherein the another normal map is created using the third attribute and the third attribute is combined with the ambient lighting component and the another diffuse lighting component to form the another enhanced image.

37. The system of claim 27, further comprising the step of displaying at least a portion of the enhanced image on a monitor to a user.

38. The system of claim 27, wherein the first attribute and the second attribute each comprise multiple data values and corresponding spatial coordinates, each data value having a thee-dimensional spatial coordinate.

39. The system of claim 38, wherein the normal map comprises multiple perturbed normal vectors that are derived from the cross product of a vertical component and a horizontal component for each data value.

40. The system of claim 27, wherein the first attribute and the second attribute comprise medical data.

41. The system of claim 27, wherein the first attribute and the second attribute comprise seismic data.

42. The system of claim 27, wherein the ambient lighting component is a predetermined constant.

43. The system of claim 27, further comprising the steps of:
  calculating a specular lighting component from the tangent space normal map and the at least one of the first and second attributes used to create the normal map; and
  combining the specular lighting component, the ambient lighting component, the diffuse lighting component and the at least one of the first and second attributes to form the enhanced image.

44. The system of claim 27, further comprising the steps of:
  applying an imaginary light source to the enhanced image;
  displaying a portion of the enhanced image to a user;
  interactively repositioning at least one of the imaginary light source and the displayed enhanced image relative to a line of sight of the displayed enhanced image to the user;
  and
  repeating the converting, calculating and combining steps in claim 27.

45. A system comprising a program storage device readable by a machine, the storage device embodying a program of instructions executable by the machine for enhancing an image of one or more attributes representing a property of an object, the instructions comprising the steps of:
  selecting an attribute from multiple attributes, the attribute having its own vertices;
  creating a normal map derived from the attribute, the normal map having its own vertices;
  converting the normal map vertices and the vertices of the attribute into a matrix representing a tangent space normal map;
  calculating a diffuse lighting component from the tangent space normal map and the attribute; and
  combining an ambient lighting component with the diffuse lighting component and the attribute to form an enhanced image representing at least one property of the object.

46. A system comprising a program storage device readable by a machine, the storage device embodying a program of instructions executable by the machine for enhancing an image of multiple attributes representing a property of an object, the instructions comprising the steps of:
  selecting a first attribute and a second attribute from the multiple attributes, the first attribute and the second attribute each having its own vertices;
  creating a normal map derived from at least one of the first and second attributes, the normal map having its own vertices;
  converting the normal map vertices and the vertices of at least one of the first and second attributes used to create the normal map into a matrix representing a tangent space normal map;
  calculating a diffuse lighting component from the tangent space normal map and the at least one of the first and second attributes used to create the normal map;
  combining an ambient lighting component with the diffuse lighting component and the first and second attributes to form an enhanced image of the first and second attributes; and
  displaying at least a portion of the enhanced image to a user, the portion of the displayed enhanced image comprising at least part of the first attribute and part of the second attribute.

* * * * *

UNITED STATES PATENT AND TRADEMARK OFFICE
CERTIFICATE OF CORRECTION

| | | |
|---|---|---|
| PATENT NO. | : 7,298,376 B2 | Page 1 of 1 |
| APPLICATION NO. | : 10/628781 | |
| DATED | : November 20, 2007 | |
| INVENTOR(S) | : Christopher John Chuter | |

It is certified that error appears in the above-identified patent and that said Letters Patent is hereby corrected as shown below:

In Column 3, Line 42
  --Add the word "a" before the word "system"--

In Column 3, Line 63
  --Add a period at the end of the sentence.--

In Column 5, Line 17
  --Remove the word "not" from the sentence entirely--

In Column 7, Line 23
  --Replace the phrase "'634 application" with the phrase "'570 patent."--

In Column 10, Line 33
  --Replace the phrase "'634 application" with the phrase "'570 patent."--

Signed and Sealed this

Eighth Day of December, 2009

David J. Kappos
*Director of the United States Patent and Trademark Office*